No. 671,914.  
Patented Apr. 9, 1901.  
S. H. NESBIT.  
FISHING TACKLE.  
(Application filed Nov. 20, 1900.)  
(No Model.)

Witnesses  
B. W. Pierce  
Mattie McGinnis

Inventor  
Samuel H. Nesbit  
by Hazard & Harpham  
Attorneys.

United States Patent Office.

SAMUEL H. NESBIT, OF LOS ANGELES, CALIFORNIA.

FISHING-TACKLE.

SPECIFICATION forming part of Letters Patent No. 671,914, dated April 9, 1901.

Application filed November 20, 1900. Serial No. 37,140. (No model.)

*To all whom it may concern:*

Be it known that I, SAMUEL H. NESBIT, a citizen of the United States, residing at Los Angeles, in the county of Los Angeles, State of California, have invented new and useful Improvements in Fishing-Tackle, of which the following is a specification.

My invention relates to devices used on fishing-rods to hook the fish; and the object is to provide means to hook the fish quickly and easily and at the same time provide means so that the line will have a yielding pull when the fish is hooked and pulls on the line. I accomplish these objects by means of the device shown in the accompanying drawings, in which—

Figure 1:
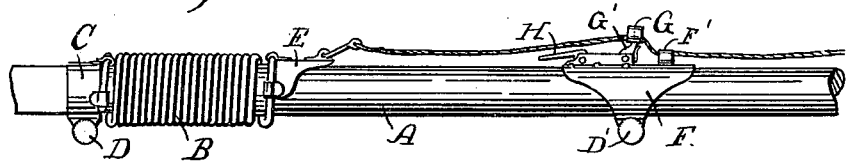
Figure 2:
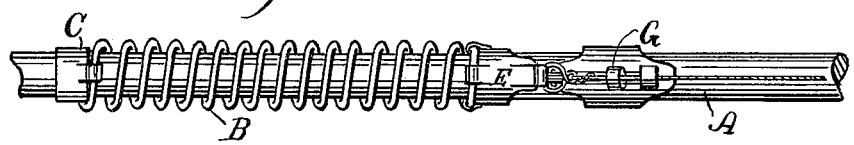
Figure 3:
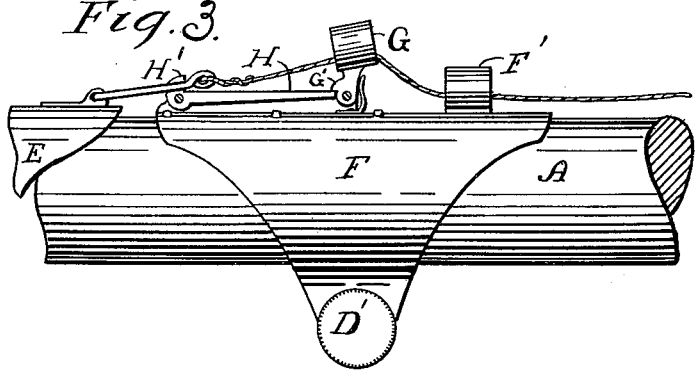

Figure 1 is a side view of a fishing-rod with my improvement placed thereon, the spring being shown in a closed position after the trigger has been sprung, the rod and line being cut away. Fig. 2 is a view of the same parts before the trigger has been sprung, the spring being shown in its open position, the trigger being set ready to be sprung. Fig. 3 is a side view of the trigger mechanism, the same being set in position ready to be sprung.

In the drawings, A represents the fishing-rod, partly cut away, on which is mounted the spiral spring B. This spring encircles the rod loosely, and the end next to the butt is made secure to the rod, close to the butt thereof, by means of the clasp C, which is removably attached to the rod by means of the thumb-screw D. Attached to the other end of the spring is a clip E, partly encircling the rod. In this clip is mounted a ring to which the end of the line is securely tied. Securely affixed on the rod and a sufficient distance from the clip C to permit the proper expansion of the spring is the clip F. This clip encircles the rod and is securely clamped thereto by the thumb-screw D'. Mounted on this clip is a trigger device comprising the trigger G, pivotally mounted on the clip F in the central part thereof and having a passage-way therethrough for the passage of the line and having on its lower shank a catch G' to engage the free end of the oscillating lever H. On the lever and close to the portion thereof where pivoted to the clip is a catch H', adapted to engage the ring on the clip E. Mounted on the upper end of the clip F is the guideway F', having an opening therein for the passage therethrough of the line I.

The device when ready for use is in the position shown in Figs. 2 and 3. If while in this position there is any slight pull on the line, such as the bite of a fish at the end of the line, it will depress the trigger G, throwing the free end of the lever H out of the catch G'. This will release the spiral spring, which will impart a quick retracting motion to the line and jerk the hook and hook the fish. Now as the fish darts away, carrying the line with it, the spiral spring being then retracted and in the position shown in Fig. 1 will prevent any sudden jerk on the line; but the line will hold the fish with a yielding pull and prevent breaking the line.

By my improvement it will be manifest that a rod mounted therewith will always be ready to hook the fish the instant the fish bites and that the line is not likely to be broken by reason of the yielding strain imparted to the line by the spiral spring.

Having described my invention, what I claim as new, and desire to secure by Letters Patent, is—

A trap for use on a fishing-rod, comprising the clip F, securely clamped to the rod; a trigger G, pivoted to the clip, with a notch G' thereon, adapted to engage the free end of the lever H, and having a hole in the free end thereof for the line to render through; the lever H provided with catch H' in combination with a spiral spring and line, substantially as shown and described.

In witness that I claim the foregoing I have hereunto subscribed my name this 14th day of November, 1900.

SAMUEL H. NESBIT.

Witnesses:
G. E. HARPHAM,
MATTIE MCGINNIS.